United States Patent [19]

Rabinowitz et al.

[11] 4,091,230
[45] May 23, 1978

[54] EVAPORATION-COOLED TRANSMISSION LINE SYSTEM

[75] Inventors: Mario Rabinowitz, Menlo Park, Calif.; James Joseph Pachot, Portland, Oreg.

[73] Assignee: Electric Power Research Institute, Inc., Palo Alto, Calif.

[21] Appl. No.: 713,066

[22] Filed: Aug. 9, 1976

[51] Int. Cl.² .............................................. H01B 7/34
[52] U.S. Cl. ................................ 174/15 C; 174/16 B; 174/27
[58] Field of Search .................. 174/15 C, 15 S, 16 B, 174/15 R, 27

[56] References Cited

U.S. PATENT DOCUMENTS

| 3,609,206 | 9/1971 | McConnell | 174/15 C |
|---|---|---|---|
| 3,800,062 | 3/1974 | Kataoka et al. | 174/27 X |
| 3,924,054 | 12/1975 | Falke | 174/27 X |
| 3,947,622 | 3/1976 | Graneau | 174/27 X |
| 3,955,042 | 5/1976 | Kellow et al. | 174/15 C |

*Primary Examiner*—Arthur T. Grimley
*Attorney, Agent, or Firm*—Townsend and Townsend

[57] ABSTRACT

A system having one or more tubular conductors disposed within shield means containing a dielectric surrounding the conductors is used to transmit electrical power. Liquid coolant is directed along a supply line from a source and into the conductors. Each conductor has a plurality of tubular insulators at spaced locations along its length to remove coolant vapor from within the conductor to maintain single phase flow while at the same time operating under two-phase cooling. Another line receives the vapor and returns it to the source of liquification. Several embodiments of the system are disclosed.

27 Claims, 8 Drawing Figures

EVAPORATION-COOLED TRANSMISSION LINE SYSTEM

This invention was made under contract with or supported by the Electric Power Research Institute, Inc.

This invention relates to improvements in the transmission of electrical power over heavy-duty conductors and, more particularly, apparatus and method for the cooling of such conductors to dissipate the heat energy developed by the flow of electrical current therethrough. Thus, this invention provides extremely high energy density transmission along relatively small transmission corridors. This invention also provides a relatively small temperature difference between the conductor and enclosure, thereby minimizing the thermomechanical stresses which are a major problem with other enclosed transmission systems, especially those using external cooling methods.

BACKGROUND OF THE INVENTION

The cooling of electrical conductors for heavy-duty power transmission lines is required in many instances to dissipate the heat generated by the flow of electrical current therethrough. Past attempts to utilize evaporative coolants for this purpose are generally inefficient because of the fact that the coolant is directed through the conductors in the liquid and vapor phases, thereby increasing the viscosity of the coolant, and thereby the friction between the coolant and the inner wall surfaces of the conductors. This result is undesirable because it increases pressure drop and hence, the load on the pumping means which is used to force the coolant through the conductors limits the total length of the conductor which can be used with a given pump capacity, and through the fluid-wall friction produces non-negligible heating. Additionally, the nonsegregated two-phase liquid-vapor is an inefficient cooling fluid as the vapor can support a significant temperature gradient relative to the liquid. This allows the temperature of the vapor and surrounding conductors to rise above that of the boiling point of the liquid.

Another approach is to use the same fluid as both the coolant flowing through the conductor and the dielectric between the conductor and an external shield surrounding the same, as described by the Battelle Northwest Laboratory. In this case, the coolant flows in the liquid state within the conductor, and some of the resulting vapor is directed into the space surrounding the conductor within the shield. In the vapor state, the substance is supposed to act as a dielectric to prevent voltage breakdown between the conductor and the shield. No discussion of the undesirable effects of increased viscosity, diminished heat transfer, and concomitant increased temperature was made. Therefore, it appears that the Battelle vapor venting was primarily to allow the fluid to serve the dual function of coolant and dielectric.

The essential problem with this approach is that it is extremely difficult to find a fluid which has both the proper coolant properties (temperature, heat of vaporization, pressure, viscosity) and good dielectric properties (high dielectric strength, molecular stability in the high electric field environment). Even if such a fluid could be found, there might still be problems due to the formation of droplets of the fluid at the conductor-dielectric interface, for if these droplets have a different dielectric constant than the fluid as a gas, this causes an additional gradient in the electric field. Also, the droplets may be subject to polarization and elongation by the electric field, thereby leading to electric breakdown between the conductor and shield.

In view of the foregoing, a need has arisen for an improved electrical transmission line system having means for adequately cooling the conductors thereof in an efficient manner without substantially increasing production and maintenance costs. Evaporation-cooling generally permits the use of less coolant mass flow and less expensive circulation equipment than that needed for single phase forced cooling. By periodically venting the evaporating coolant, undue pressure and heat build-up associated with unvented two-phase (vapor-liquid) flow can be avoided.

SUMMARY OF THE INVENTION

The present invention is directed to an improved electrical transmission line system having improved coolant means for the conductors thereof wherein a number of tubular conductors are surrounded by shield means and isolated therefrom by insulators to space the conductors inwardly of the inner surface portions of the shield means. Each conductor is supplied with a liquid coolant from a suitable coolant source and the coolant is caused to flow along the length of the conductor to cool the same. As coolant absorbs the heat energy, part of the coolant passes into the vapor phase as the remainder continues to flow through the conductors. Each conductor is provided with a plurality of tubular insulators along its length so that the coolant vapor can be vented to a return line exteriorly of the shield means and extending to the coolant source for liquification. In this way, the coolant in the conductors is substantially only in the liquid phase and the vapor is removed from the conductor substantially as soon as it is generated to minimize an increase in viscosity of the coolant and the resultant increase in friction which occurs when the coolant is in a mixed phase as in state of the art systems. Thus, the pumping load required to urge the coolant through the conductor is minimized and the conductors can be relatively long for a given pump capacity to thereby provide an efficient system which requires little or no maintenance. This invention applies to virtually any enclosed transmission system utilizing hollow inner conductors, and may be used to greatly increase the power transmission capability of such systems. The high electric field region of these systems may contain whatever appropriate high dielectric strength material is desired — be it solid, liquid, gas or vacuum.

This invention also contemplates a method for cooling the conductors of a system of the type described wherein the coolant is supplied to the conductors as a liquid at a temperature near the boiling point of the coolant in the pressure range at which the system is to operate. Thus, the heat absorbed by the coolant will be used substantially to produce vapor by supplying the latent heat of vaporization, thus keeping the temperature rise to a minimum. Therefore, the coolant is efficiently used to cool the conductors, yet the resulting coolant vapor is substantially immediately vented from the conductors as soon as the vapor is generated at various locations along the lengths of the conductors. The conductors can continuously operate to carry more electrical current in an efficient manner than is otherwise possible when they are cooled by conventional methods.

Several embodiments of the apparatus of the system are possible within the teachings of the present invention. For instance, a number of conductors can be at spaced locations within a single shield and spaced inwardly from the inner surface of the shield by solid insulators, a number of such insulators of each conductor being tubular so that the coolant vapor can be moved through such tubular insulators to reach one or more vapor lines exteriorly of the shield. A coolant supply line will also be exteriorly of the shield. A dielectric will be in the space between each conductor and the shield. Periodic venting of the vapor prevents the pressure and heat accumulation which would result if a major part of the liquid evaporated inside the conductors.

In another embodiment, each conductor has its own surrounding shield and the shields for several conductors are disposed within a tubular housing which supports the shields. A dielectric in each shield surrounds the adjacent conductors. The coolant vapor is disposed inside the tubular housing and exteriorly of the shields; and the liquid line may be disposed either inside or outside of the tubular housing.

In a third embodiment, the conductors have individual surrounding shields with the space between the shields and the conductors being provided with a dielectric. In this embodiment, the shields are coupled to a central support tube about which the shields are disposed. The tube can carry the liquid coolant line, and one or more vapor lines will be exteriorly of the shields.

The primary object of this invention is, therefore, to provide a transmission line system having a number of tubular conductors which are evaporatively cooled to minimize or substantially eliminate the inefficiencies inherent in the practice of conventional methods of cooling.

Another object of this invention is to provide apparatus and a method for cooling the conductors of an electrical power transmission system wherein a number of conductors are disposed within shield means and have means for removing coolant vapor at various locations along their lengths so that a liquid coolant supplied to each conductor will remain substatially only in a liquid phase due to removal of the vapor at various locations along its length to thereby minimize the increase in viscosity of the coolant due to a mixed phase thereof and thereby to minimize the pump load required to urge the coolant through the conductors.

Another object of this invention is to provide a system of the aforesaid character wherein the coolant is supplied to the conductors in a liquid phase near its boiling point so that cooling of the conductors can occur as the coolant absorbs heat energy equivalent to the latent heat of vaporization of the coolant and the resulting vapor can be removed from the conductors at specific locations along their lengths to assure that the liquid remains substantially in a liquid phase within the conductors.

Another object of this invention is to provide a simple, inexpensive method of making clean leak-tight conductor joints that do not leave any contamination in the high electric field region.

Other objects of this invention will become apparent as the following specification progresses, reference being had to the accompanying drawing for several embodiments of the invention.

In the drawings

FIG. 5 is a view similar to FIG. 1 but showing another embodiment of the transmission line apparatus; and FIG. 6 is a view similar to FIG. 1 and 5 but showing a third embodiment of the apparatus.

Figure 2:
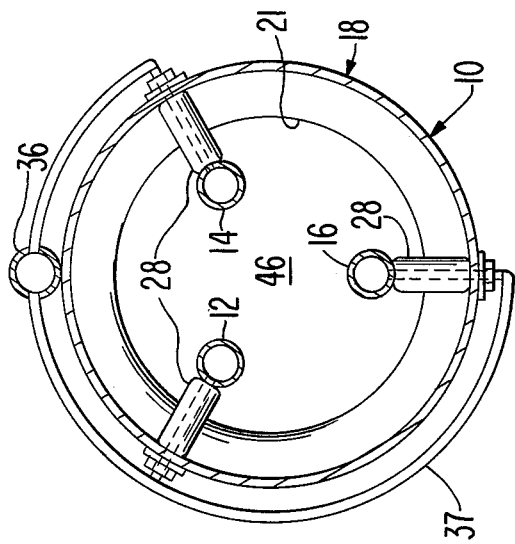
FIG. 2 is an enlarged, fragmentary cross-sectional view showing a more detailed view of the tubular insulator for one of the conductors of the apparatus.
Figure 3:
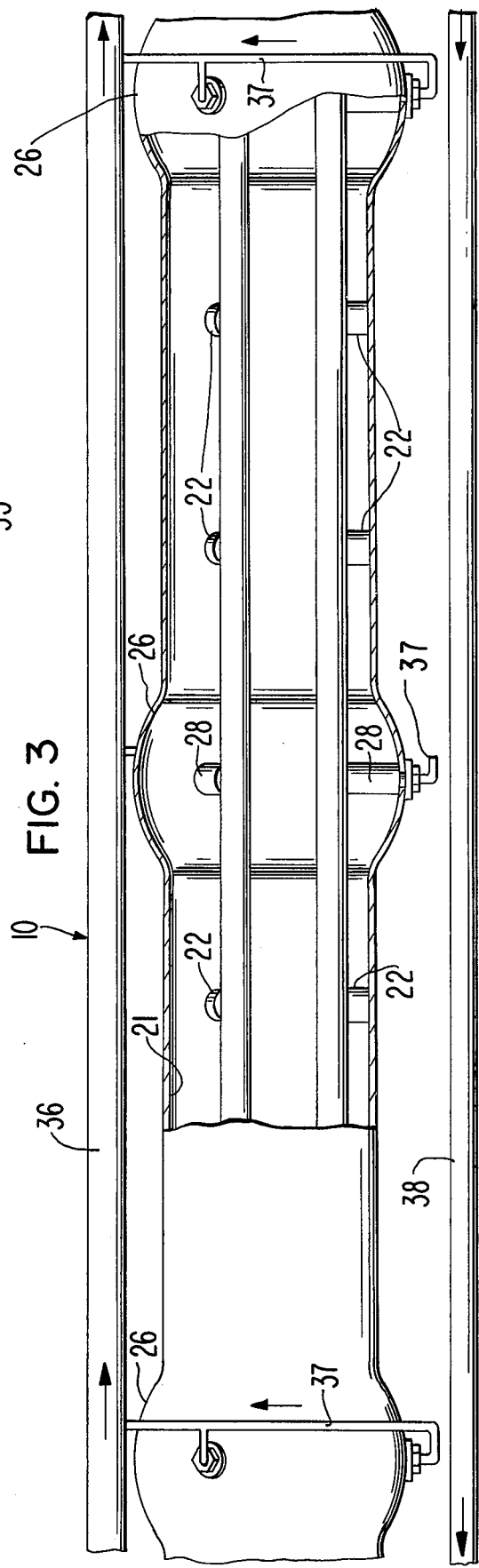
FIG. 3 is a fragmentary side elevational view of the apparatus.
Figure 4:
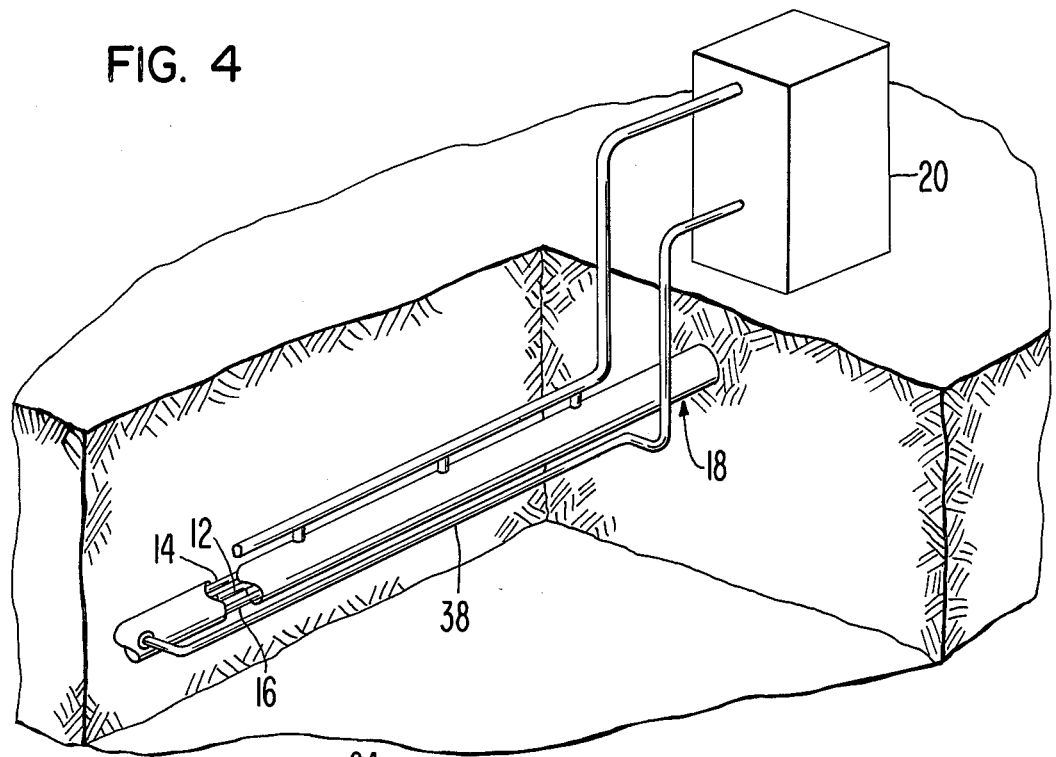
FIG. 4 is a perspective view of a portion of the assembly, showing a coolant source coupled with the conductors of the transmission line apparatus.

A first embodiment of the evaporation cooled transmission line apparatus is illustrated in FIGS. 1–4 and is broadly denoted by the numeral 10. Apparatus 10 includes a number of spaced, tubular electrical conductors 12, 14 and 16 disposed within an electrically conducting shield 18 which may be disposed below ground level as shown in FIG. 4 in which a heat exchanger and pump cooling unit 20, herein called the coolant source, is shown above ground. The smaller cross-sectional diameter of the shield 18, is depicted by the inner ring shown in FIG. 1. Apparatus 10 operates to permit electrical current to be conducted along the lengths of conductors 12, 14 and 16 and because of the heat generated by the current flow in the conductors, the latter must be cooled by directing a liquid coolant therethrough. The cooling is done by evaporation cooling inasmuch as the liquid coolant is directed from a coolant source 20 (FIG. 4) to the three conductors in a liquid phase wherein the liquid has a temperature close to its boiling point with reference to a pressure at which the system is to operate. Thus, at least the major portion of the heat energy absorbed by the coolant will be relied upon to supply the latent heat of vaporization to cool the conductors. This feature provides high density cooling and thereby assures efficient operation of the conductors at the design current ratings threof.

The coolant can be of any suitable fluid. For instance, it can be any of a number of Freons or other fluorinated ethers. Table I lists some possible fluids in order of decreasing boiling point.

TABLE I

| | POSSIBLE COOLING FLUIDS | |
|---|---|---|
| | Fluid | Boiling Point (° C) |
| 1. | $H_2O$ (Water) | 100 |
| 2. | $(C_4F_9)_3N$ | 69 |
| 3. | $CF_2ClC-CF_2-CF_3$ | 64 |
| 4. | $(C_3F_7)_2O$ | 56 |
| 5. | $C_6F_{12}O$ | 56 |
| 6. | $C_6F_{14}$ | 55 |
| 7. | FC-122 (Fluorinert) | 51 |
| 8. | FC-78 (No H, Fluorinert) | 50 |
| 9. | $CCl_2F-CClF_2$ (Freon 113) | 48 |
| 10. | $C_3F_7OCHCF_3$ (Freon E-1) | 41 (Fluorinated Ethers) |
| 11. | $CClF=CClF$ | 38 |
| 12. | $C_5F_8$ | 34 |
| 13. | FC-88 (Fluorinert) | 31 |
| 14. | $C_5F_{12}$ (N-perfluoropentane) | 29.3 |
| 15. | $CCl_3F$ (Freon 11) | 24 |
| 16. | $C_4F_6O_2$ | 18 |
| 17. | $NH_3$ (Liquid Ammonia) | −33.3 |

TABLE I-continued

POSSIBLE COOLING FLUIDS

| | Fluid | Boiling Point (° C) |
|---|---|---|
| 18. | SF$_6$ (Liquid Sulfur Hexafluoride) | −68 |

For example, fluid 9, designated as Freon 113, has a relatively high dielectric strength in the gaseous state. Thus, in a system which may not be leak-tight, or in which the fluid may be exposed to a moderately high electric field in the tubular discharge insulators 28, it would be preferable to use such a fluid with higher dielectric strength. If Freons are used in such a situation, adding small amounts of $CO_2$ or NO to Freon gases helps to prevent carbon deposits during arcing. Liquid ammonia and $SF_6$ are listed to include those liquids with a boiling point well below ambient, which may be used in systems with adequate thermal insulation.

Each of the three conductors within shield 18 is mounted to the inner surface 21 (FIGS. 1 and 3) of shield 18 by spaced support insulators 22 so that the conductors are spaced inwardly from the inner surface 21 of the shield and are spaced from each other as shown in FIG. 3. Thus, an electrical field can be safely established between the conductors and the shield. The length and material of each support insulator 22 will be sufficient to prevent a breakdown of the electric field.

Figure 1:
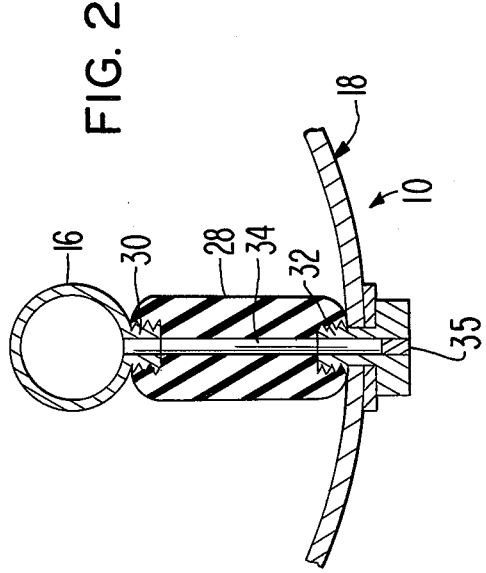
FIG. 1 is a vertical section through a first embodiment of a transmission line apparatus of the present invention.

The shield may be provided with a number of spaced enlargements 26 along its length. Adjacent to each of these enlargements 26, each conductor has a tubular insulator 28 spanning the distance between the conductor and the shield as shown in FIGS. 1 and 2, the enlargements being provided in the event that the coolant vapor has such a low dielectric strength in passing through insulators 28 that the electric field needs to be reduced by means of enlargements 26.

Each conductor can be coupled in any suitable manner to the corresponding insulator 28. For purposes of illustration, the insulator may be threadably mounted on an externally threaded projection 30 on a corresponding conductor and receive a threaded plug 32 of insulation material at its outer end, the plug having a portion extending through an opening through the shield as shown in FIG. 2 and tightened so that insulator 28 will be securely fastened to the shield.

A fluid passage 34 extends through each insulator 28 and places the interior of the corresponding conductor in fluid communication with a fluid flow line 36 which returns coolant vapor back to the source 20 where the vapor is liquified. A porous pressure valve 35 is present in the fluid passage 34 to control the release of only vapor at the predetermined boiling point of the cooling liquid. Pressure relief of a liquid near its boiling point will cause rapid vaporization of the liquid. The coolant supply line 38 from source 20 has a downstream end 40 which extends through the side of shield 18 and is coupled to conductors 12, 14 and 16 in any suitable manner, such as by a fluid distributor (not shown). Thus, the liquid coolant can flow into and along the three conductors and cool the same. In so doing, the liquid coolant is progressively vaporized and the vapor is directed out of the conductors at spaced locations along their lengths through the various insulators 28. The vapor is then directed into line 36 for return to source 20 under the influence of pump means (not shown) forming a part of the source.

While only a single vapor return line 36 has been shown, there could be a vapor return line for each conductor respectively. Since heated vapor will ordinarily rise, line 36 will be above shield 18 and conductors 12 and 14, for purposes of illustration, are shown above conductor 16. Relatively short, curved tubes 37 (FIGS. 1 and 3) at the outer ends of the insulators 28 of conductors 12, 14 and 16 will communicate with and carry vapor to line 36 as shown in FIG. 1. Tubes 37 are omitted in FIG. 4 to simplify the drawing.

The interior space 46 of shield 18 is filled with a dielectric which can be a solid, liquid, gas, or vacuum. It can be of any appropriate high dielectric strength material including compressed gas insulation, such as $SF_6$ or taped insulation around each of conductors 12, 14 and 16. Space 46 is also isolated from the liquid coolant flowing through the conductors. The degree of isolation required will depend upon the coolant and the dielectric. In some cases, small amounts of the coolant vapor may be compatible with the primary dielectric in space 46 so that the sealing requirements need not be too stringent. Gas separation methods to keep the contamination level fairly low may be preferable in some cases to leak-tight seals. Otherwise, it is important to assure leak-tight joints between adjacent lengths of each conductor to prevent entrance of the coolant fluid into the high electric field region.

Lengths of inner conductors and shields may be joined by a variety of methods. Ends could be oppositely threaded and a threaded insert operated like a turnbuckle could join them; or they could be simply welded, explosively welded, etc.

The joining of the shields is relatively less crucial than the conductors as any contaminants remaining after a welding process are external to the high electric field region, and the shields themselves are in regions of low electric field. Just the opposite is the case for the conductors. The joining of the conductors is crucial for several reasons. Contaminants must be removed because they are in the high electric field region; similarly for protuberances and microprotrusions. In addition, the conductors carry a much higher current density, so the joint must also be better from this point of view. It must also be leak-tight for use of coolants of low dielectric strength.

Figure 3A:
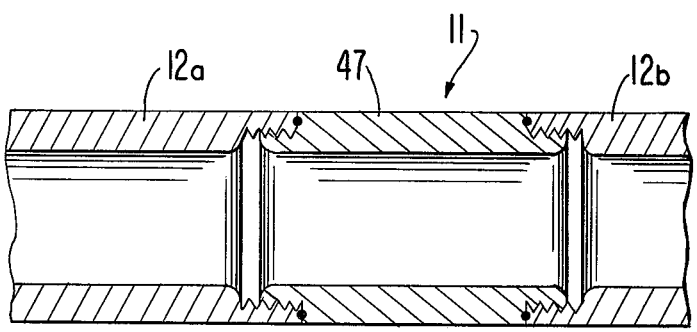
FIG. 3A is an enlarged, fragmentary cross-sectional view of a conductor having a pair of sections interconnected by a turnbuckle-like device.
Figure 3B:
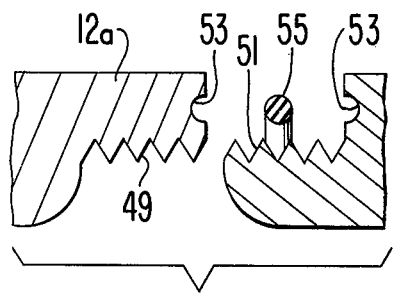
FIG. 3B is an enlarged, fragmentary, cross-sectional view of the device of FIG. 3A, showing its axial relation to one of the conductor sections.

Our solution to the above-mentioned problems is illustrated in FIGS. 3A and 3B. FIG. 3A shows a joint 11 formed by a turnbuckle-like sleeve 47 joining the ends of conductors 12a and 12b. The joint between sleeve 47 and conductor 12a is shown in enlarged, exploded form in FIG. 3B where the threads 49 and 51 are of opposite pitch at the ends of the sleeve 47. Aligned, annular grooves 53 in flat end faces of the sleeve and sections are adapted to receive respective continuous gaskets or seats 55. The gasket material should be easily deformable to make a good seal, and also of good electrical conductivity. Suitable gasket materials would include gold, copper, and indium. Thus a good, clean, leaktight joint could be made without welding, and the concomitant problems normally associated with it would be eliminated.

Typically, apparatus 10 will be made up of a number of sections of the type shown in FIG. 4. Each section will have three conductors within a shield which could have a length of 0.8 to 8 km (½ to 5 miles), and a number of such sections connected together could stretch for 10 to 100 miles or more. At the junctions between sections, the interiors of the conductors would be plugged with a suitable material to prevent the coolant of one section from passing into the next adjacent section. In each section, the venting insulators 28 would be spaced apart a distance in the range of 2 to 100m (6 to 300 feet). The a significant fraction of electronegative atoms such as the halogens. Table II lists approximate values for some physical properties of a few possible cooling fluids.

TABLE II

PHYSICAL PROPERTIES OF SOME COOLING FLUIDS

| | Fluid | Viscosity (mpoise) | Heat Vaporization (cal/gm) | Density (gm/cm$^3$) | Surface Tension (dynes/cm) |
|---|---|---|---|---|---|
| 1. | H$_2$O (Water) | 2.8 | 540 | 0.96 | 60 |
| 2. | FC-78 (No H, Fluorinert) | 6.8 | 25 | 1.91 | — |
| 3. | C$_2$Cl$_3$F$_3$ (Freon 113) | 6.9 | 35 | 1.57 | 19 |
| 4. | C$_3$F$_7$OCHCF$_2$ (Freon E-1) | 5.0 | 23 | 1.54 | 10.4 |
| 5. | FC-88 (Fluorinert) | 6.5 | 21 | 1.84 | — |
| 6. | C$_5$F$_{12}$ (N-perfluoropentane) | 4.6 | 22.6 | 1.60 | 10.0 |
| 7. | CCL$_3$F (Freon 11) | 4.4 | 43 | 1.49 | 19 |
| 8. | NH$_3$ (Liquid Ammonia) | 2.7 | 327 | 0.82 | 23 |
| 9. | SF$_6$ (Liquid Sulfur Hexafluoride) | — | 21 | — | — |

Water looks attractive because it is inexpensive, has a high heat of vaporization, and a low viscosity. Its undesirable features are its corrosiveness, and its low dielectric strength in case its vapor gets into regions of high electric stress. It could be operated at less than one atmosphere pressure to reduce its boiling point significantly below 100° C so that the conductors may operate at reduced ohmic loss.

longer the transmission line section, the closer the desired spacing between vents. Conversely, the shorter the section, the further apart that vent spacing can be tolerated. The optimum length of sections and of the vent spacing will be a function of the coolant properties, the transmission line, and economic tradeoffs. If the transmission line is relatively short, it would not be necessary to remove vapor through venting insulators 28. Rather, the vapor may be removed at the cable terminations.

In operation, electrical current flowing along conductors 12, 14 and 16 will cause the same to be heated. Liquid coolant flowing out of source 20 will enter the conductors from line 38 and will flow back toward source 20 through the conductors. In so doing, the coolant will be near its boiling point at a specific pressure, will become partially vaporized, and the vapor will directly be vented at the various insulators 28 to vapor return line 36. The vaporization continues as the liquid coolant continues to flow toward the source. At each enlargement 26, accumulated vapor will be removed from the interior of the conductors, thereby keeping the coolant substantially in a liquid phase within the conductors and thereby minimizing the pumping load required to urge the coolant through the conductor since there is less viscosity and minimal friction effects due to the presence of the coolant within the conductor. The lengths of the conductors can, therefore, be relatively long for a given pump capacity, thereby providing economies in manufacturing and installing apparatus 10.

The reason enlargements 26 are provided is to increase the length of fluid flow passages 34 to minimize the magnitude of the electric field between the enlargement and each conductor. This reduces the possibility of electric breakdown in the vapor flowing through each passage. These enlargements 26 would only be necessary for vapor which has a relatively low dielectric strength with respect to the dielectric strength of the insulating medium in space 46.

The cooling fluid should have excellent chemical stability, being resistant to oxidation and hydrolysis, as well as having a number of optimum physical properties — some of which are mutually exclusive. High heat of vaporization, low viscosity, low surface tension, and low density are among the desired physical properties. If the vapor is to be exposed to regions of relatively high electric field, then the requirement of higher dielectric strength can be met with compounds containing Two other embodiments of the apparatus of this invention are shown in FIGS. 5 and 6. In FIG. 5, three conductors 50, 52 and 54 are disposed concentrically within respective shields 56, 58 and 60 by radial insulators 62 coupled in any suitable manner to the respective conductors and shields. The space 64 within each shield and surrounding the corresponding conductors is provided with a suitable dielectric material which can be solid, liquid, gas, or vacuum. The three shields are supported by an external, tubular housing 66 and a liquid coolant line 68 externally of the housing 66 is provided to supply liquid coolant to conductor 50, 52 and 54 from a source, such as by supply lines 65 connected to certain tubular insulators 62 having fluid passages 72 therethrough.

Tubular housing 66 acts as a common vapor return for conductors 50, 52 and 54. The return line, i.e., the interior of housing 66, receives vapor from the conductors through a number of fluid passages 72 in other insulators 62 of corresponding conductors so that vapor can be removed from the interior of the conductor through porous pressure valves 73 at spaced locations along the length of the conductors in the manner disclosed above with respect to the embodiment of FIGS. 1-4. The operation of this embodiment is the same as that shown in FIGS. 1-4.

FIG. 6 shows an embodiment having three conductors 80, 82 and 84 disposed concentrically within respective shields 86, 88 and 90 by insulators 92. Shields 86, 88 and 90 are supported by a central tube 94 and are angularly spaced from each other about the tube. Tube 94 acts as a coolant supply for connection with the three conductors. Also, each conductor has a number of insulators 92 which are provided with fluid passages 98 therethrough for coupling the conductor by means of porous pressure valves 99 with a vapor return line 100 for the same purpose as line 36 of the embodiment of FIG. 4 and housing 66 of the embodiment of FIG. 5. These tubular insulators 92 are located adjacent to enlargements along the length of each corresponding shield, such enlargements being substantially the same in construction as those denoted as numeral 26 in FIG. 3. The space 102 within each shield and surrounding the corresponding conductor is provided with a suitable dielectric material which can be solid, liquid, gas or vacuum. The operation of the embodiment of FIG. 6 is substantially the same as that with respect to the embodiment of FIGS. 1-4.

What is claimed is:

1. An elecrical power transmission system comprising: a number of tubular electrical conductors; shield means surrounding the conductors to permit an electric field to be established therebetween, the space between the shield means and each conductor adapted to receive a dielectric medium to prevent voltage breakdown therebetween; a source of liquid coolant; a first conduit means for directing liquid coolant from said source to each conductor; second conduit means for directing coolant vapor to said source for liquification; and means at each of a plurality of spaced locations along each conductor, respectively, for placing the corresponding conductor in fluid communication with said second conduit means to allow the venting of coolant vapor thereto to assure that the coolant will be substantially only in a liquid phase in the conductors.

2. A system as set forth in claim 1, wherein said shield means comprises a single, tubular shield surrounding all of said conductors.

3. A system as set forth in claim 1, wherein said shield means comprises a shield for each conductor, respectively, and including means coupled with the shields for supporting the shields.

4. A system as set forth in claim 3, wherein said supporting means comprises a tubular housing surrounding the shields, the latter being coupled to the housing at spaced locations on the inner surface of the latter.

5. A system as set forth in claim 3, wherein said supporting means comprises a tube, said shields being secured at circumferentially spaced locations to the outer surface of the tube.

6. A system as set forth in claim 5, wherein said first conduit means extends through the tube.

7. A system as set forth in claim 1, wherein each conductor has a plurality of tubular insulators at spaced locations along the same, said insulators spanning the distance between the corresponding conductor and the shield means, there being a tube connecting the outer end of each insulator to said second conduit means.

8. A system as set forth in claim 7, wherein said shield means has an enlargement adjacent to each insulator of each conductor, respectively, with said enlargement being operable to increase the distance between the conductor and shield means and thereby decrease the intensity of the electric field therebetween.

9. A system a set forth in claim 1, and including means independent of said placing means for supporting each conductor in an inwardly spaced relationship to an inner surface portion of said shield means.

10. A system as set forth in claim 9, wherein said supporting means includes a plurality of insulators disposed along the length of the conductor.

11. A method of cooling an electrical power transmission system having a number of tubular electrical conductors in shield means surrounding the conductors comprising: directing a liquid coolant into the conductors to flow therethrough and to cool the same as the coolant absorbs heat from the conductors and is transformed to a vapor; venting the vapor from each conductor at each of a plurality of spaced locations along the same to assure that the coolant in the conductors remains substantially in a liquid phase; liquifying the vapor; and returning the liquid coolant to the conductors.

12. A method as set forth in claim 11, wherein said liquid coolant is introduced into the conductor at a temperature approximately slightly less than the boiling point of the coolant.

13. A method as set forth in claim 11, wherein the liquifying step is performed at a location remote from said conductors.

14. A method as set forth in claim 11, wherein the venting of the conductors is done near the upper extremity of each conductor.

15. A method as set forth in claim 11, wherein is included the step of providing a dielectric material in the space between each conductor and the shield means, and isolating the conductors from said space to prevent contamination of the coolant with the dielectric material.

16. A system as set forth in claim 1, wherein at least one of the conductors has a pair of spaced, axially aligned sections, and means coupled with said sections for interconnecting the same and for placing them in fluid communication with each other, the junction between each section and said means having sealing means to prevent leakage of fluid therethrough.

17. A system as set forth in claim 16, wherein said means includes a sleeve having a pair of opposed ends threadably coupled with respective conductor sections, said sealing means including a continuous seal between the sleeve and each conductor section, respectively.

18. An electrical power transmission system comprising: a number of tubular electrical conductors; shield means surrounding the conductors to permit an electric field to be established therebetween, the space between the shield means and each conductor adapted to receive a dielectric medium to prevent voltage breakdown therebetween; a source of liquid coolant; a first conduit means for directing liquid coolant from said source to each conductor; second conduit means for directing coolant vapor to said source for liquification; and means at one end of conductor, respectively, for placing the latter in fluid communication with said second conduit means to allow the venting of coolant vapor thereto to assure that the coolant will be substantially only in a liquid phase in the conductors.

19. A system as set forth in claim 18, wherein said shield means comprises a single, tubular shield surrounding all of said conductors.

20. A system as set forth in claim 18, wherein said shield means comprises a shield for each conductor, respectively, and including means coupled with the shields for supporting the same.

21. A system as set forth in claim 20, wherein said supporting means comprises a tubular housing surrounding the shields, the latter being coupled to the housing at spaced locations on the inner surface of the latter.

22. A system as set forth in claim 20, wherein said supporting means comprises a tube, said shields being secured at circumferentially spaced locations to the outer surface of the tube.

23. A system as set forth in claim 22, wherein said first conduit means extends through the tube.

24. A system as set forth in claim 18, wherein each conductor has a plurality of tubular insulators at spaced locations along the same, said insulators spanning the distance between the corresponding conductor and the shield means, there being a tube connecting the outer end of each insulator to said second conduit means.

25. A system as set forth in claim 24, wherein said shield means has an enlargement adjacent to each insulator of each conductor, respectively, with said enlargement being operable to increase the distance between the conductor and shield means and thereby decrease the intensity of the electric field therebetween.

26. A system as set forth in claim 18, wherein is included means independent of said placing means for supporting each conductor in an inwardly spaced relationship to an inner surface portion of said shield means.

27. A system as set forth in claim 26, wherein said supporting means includes a plurality of insulators disposed along the length of the conductor.

* * * * *